United States Patent
Everett

(10) Patent No.: US 9,071,444 B2
(45) Date of Patent: Jun. 30, 2015

(54) TRUSTED MESSAGE STORAGE AND TRANSFER PROTOCOL AND SYSTEM

(75) Inventor: David Everett, Rustington (GB)

(73) Assignee: ROYAL CANADIAN MINT/MONNAIE ROYALE CANADIENNE, Ottawa (CA)

( * ) Notice: Subject to any disclaimer, the term of this patent is extended or adjusted under 35 U.S.C. 154(b) by 25 days.

(21) Appl. No.: 13/496,769

(22) PCT Filed: Sep. 17, 2010

(86) PCT No.: PCT/CA2010/001434
§ 371 (c)(1),
(2), (4) Date: May 29, 2012

(87) PCT Pub. No.: WO2011/032271
PCT Pub. Date: Mar. 24, 2011

(65) Prior Publication Data
US 2012/0233470 A1    Sep. 13, 2012

Related U.S. Application Data

(60) Provisional application No. 61/243,203, filed on Sep. 17, 2009.

(30) Foreign Application Priority Data

Mar. 30, 2010  (CA) .................. PCT/CA2010/000435

(51) Int. Cl.
*H04L 29/06* (2006.01)
*H04L 9/32* (2006.01)
(Continued)

(52) U.S. Cl.
CPC .............. *H04L 9/3263* (2013.01); *G06Q 30/06* (2013.01); *H04L 9/321* (2013.01);
(Continued)

(58) Field of Classification Search
CPC ... H04L 9/3263; H04L 9/321; H04L 12/6418; H04L 2209/56; H04L 63/123; H04L 63/126; G06Q 20/3825; G06Q 20/12; G06Q 20/32; G06Q 30/06
USPC ................... 713/168, 170, 176; 709/206, 232
See application file for complete search history.

(56) References Cited

U.S. PATENT DOCUMENTS

| | | |
|---|---|---|
| 5,623,547 A | 4/1997 | Jones et al. |
| 5,778,067 A | 7/1998 | Jones et al. |

(Continued)

FOREIGN PATENT DOCUMENTS

| | | |
|---|---|---|
| CN | 1536807 A | 10/2004 |
| CN | 1669266 A | 9/2005 |

(Continued)

OTHER PUBLICATIONS

Chaum, et al., "Blind Signatures for Untraceable Payments", Advances in Cryptology Proceedings of CRYPTO 82, D.Chaum, R.L. Rivest & A.T. Sherman (Eds), Plenum, pp. 199-203.

(Continued)

*Primary Examiner* — Sarah Su
(74) *Attorney, Agent, or Firm* — Pearne & Gordon LLP

(57) ABSTRACT

An electronic content storage and exchange system includes an interface configured to send and receive messages; a database and a controller. The database includes a plurality of records, each record representing a respective virtual storage media and including at least: a respective unique identifier assigned to the virtual storage media; a respective Private key and certificate assigned to the virtual storage media; a current content value, and a log of content transfers. The controller executes transfer-in and transfer-out processes in respect of each of the virtual storage media. The transfer-in process includes steps of: receiving a content transfer message including at least a message content to be transferred and the respective identifier assigned to a recipient virtual storage media; accessing the record representing the recipient virtual storage media; and storing the message content in the current content of the recipient virtual storage media. The transfer-out process includes steps of: receiving a content transfer request message including at least at least a message content to be transferred and the respective identifier assigned to a sending virtual storage media; accessing the record representing the sending virtual storage media; removing the message content from the current content; generating a content transfer message including the message content; and returning the content transfer message.

18 Claims, 8 Drawing Sheets

(51) Int. Cl.
*G06Q 30/06* (2012.01)
*H04L 12/64* (2006.01)
*G06Q 20/12* (2012.01)
*G06Q 20/32* (2012.01)
*G06Q 20/38* (2012.01)

(52) U.S. Cl.
CPC ........ *H04L 12/6418* (2013.01); *H04L 2209/56* (2013.01); *G06Q 20/12* (2013.01); *G06Q 20/32* (2013.01); *G06Q 20/3825* (2013.01); *H04L 63/123* (2013.01); *H04L 63/126* (2013.01)

(56) References Cited

U.S. PATENT DOCUMENTS

| | | | |
|---|---|---|---|
| 5,974,150 A * | 10/1999 | Kaish et al. | 713/179 |
| 6,119,946 A | 9/2000 | Teicher | |
| 6,142,369 A | 11/2000 | Jonstromer | |
| 6,327,578 B1 * | 12/2001 | Linehan | 705/65 |
| 6,496,853 B1 * | 12/2002 | Klein | 709/206 |
| 7,587,368 B2 | 9/2009 | Felsher | |
| 7,721,108 B2 | 5/2010 | Pailles et al. | |
| 7,730,314 B2 | 6/2010 | Kim | |
| 7,734,732 B2 * | 6/2010 | Soelberg et al. | 709/219 |
| 7,805,377 B2 | 9/2010 | Felsher | |
| 7,908,216 B1 * | 3/2011 | Davis et al. | 705/41 |
| 7,953,671 B2 | 5/2011 | Bishop et al. | |
| 7,992,792 B2 | 8/2011 | Van Rensburg | |
| 8,055,558 B2 | 11/2011 | Yuan et al. | |
| 8,175,973 B2 | 5/2012 | Davis et al. | |
| 8,498,941 B2 | 7/2013 | Felsher | |
| 8,533,116 B2 | 9/2013 | Davis et al. | |
| 8,805,746 B2 | 8/2014 | Hoffman et al. | |
| 8,886,932 B2 * | 11/2014 | Everett | 713/164 |
| 2002/0010679 A1 | 1/2002 | Felsher | |
| 2002/0040337 A1 | 4/2002 | Kikuchi | |
| 2003/0023854 A1 * | 1/2003 | Novak et al. | 713/182 |
| 2003/0084106 A1 * | 5/2003 | Erev et al. | 709/206 |
| 2003/0220821 A1 * | 11/2003 | Walter et al. | 705/3 |
| 2006/0085359 A1 | 4/2006 | Kim | |
| 2006/0168205 A1 * | 7/2006 | Barron et al. | 709/224 |
| 2006/0168447 A1 | 7/2006 | Pailles et al. | |
| 2007/0044157 A1 | 2/2007 | Taguchi et al. | |
| 2007/0050294 A1 * | 3/2007 | Trottier et al. | 705/50 |
| 2007/0160199 A1 * | 7/2007 | Sekiguchi et al. | 380/28 |
| 2007/0250451 A1 | 10/2007 | Lee et al. | |
| 2007/0274225 A1 | 11/2007 | Kikuchi | |
| 2007/0282625 A1 | 12/2007 | Kikuchi | |
| 2007/0282706 A1 | 12/2007 | Kikuchi | |
| 2007/0282720 A1 | 12/2007 | Kikuchi | |
| 2008/0021727 A1 | 1/2008 | Kikuchi | |
| 2008/0037422 A1 | 2/2008 | Kikuchi | |
| 2008/0037455 A1 | 2/2008 | Kikuchi | |
| 2008/0306872 A1 | 12/2008 | Felsher | |
| 2008/0319881 A1 | 12/2008 | Kikuchi | |
| 2009/0006123 A1 | 1/2009 | Kikuchi | |
| 2009/0132272 A1 | 5/2009 | Kikuchi | |
| 2009/0151006 A1 * | 6/2009 | Saeki et al. | 726/28 |
| 2009/0157536 A1 | 6/2009 | Kikuchi | |
| 2009/0216842 A1 * | 8/2009 | Risher et al. | 709/206 |
| 2009/0287837 A1 | 11/2009 | Felsher | |
| 2009/0327718 A1 * | 12/2009 | Hirai | 713/168 |
| 2010/0082462 A1 | 4/2010 | Yuan et al. | |
| 2010/0133337 A1 | 6/2010 | Van Rensburg | |
| 2010/0241595 A1 | 9/2010 | Felsher | |
| 2011/0125638 A1 | 5/2011 | Davis et al. | |
| 2012/0023035 A1 * | 1/2012 | Kuhnle et al. | 705/36 R |
| 2012/0198550 A1 * | 8/2012 | Everett | 726/22 |
| 2012/0239565 A1 | 9/2012 | Davis et al. | |
| 2013/0246787 A1 * | 9/2013 | Everett | 713/164 |
| 2013/0282552 A1 * | 10/2013 | Everett | 705/37 |
| 2014/0046746 A1 | 2/2014 | Davis et al. | |
| 2014/0165218 A1 * | 6/2014 | Lin et al. | 726/32 |
| 2015/0039738 A1 * | 2/2015 | Subramani et al. | 709/223 |

FOREIGN PATENT DOCUMENTS

| | | |
|---|---|---|
| CN | 1813266 A | 8/2006 |
| CN | 1832400 A | 9/2006 |
| EP | 1770576 A2 | 4/2007 |
| JP | H03-97347 A | 4/1991 |
| JP | 2002108824 A | 4/2002 |
| JP | 2002157532 A | 5/2002 |
| JP | 2003044769 A | 2/2003 |
| JP | 2005529547 A | 9/2005 |
| JP | 2006121687 A | 5/2006 |
| WO | 9632700 A1 | 10/1996 |
| WO | 0108113 A1 | 2/2001 |
| WO | 0205061 A2 | 1/2002 |
| WO | 03105399 A1 | 12/2003 |
| WO | 2008075143 A1 | 6/2008 |
| WO | 2008089684 | 7/2008 |

OTHER PUBLICATIONS

Satoshi Nakamoto: "Bitcoin: A Peer-to-Peer Electronic Cash System", Oct. 31, 2008, XP055131503, Retrieved from the Internet: URL:https://bitcoin.org/bitcoin.pdf [retrieved on Jul. 24, 2014], pp. 1-9.

Satoshi Nakamoto: "Bitcoin v0.1 released", Jan. 9, 2009, XP055131589, Retrieved from the Internet: URL:http://www.mail-archive.com/cryptography@metzdowd.com/msg10142.html {retrieved on Jul. 24, 2014], pp. 1-3.

Rostislav Skudnov: "Bachelors Thesis (UAS) Degree Program in Information Technology 2012", Jan. 1, 2012, XP055131590, Retrieved from the Internet: URL:http://publications.theseus.fi/bitstream/handle/10024/47166/Skudnov_Rostislav.pdf?sequence=1 [retrieved on Jul. 24, 2014], pp. 1-38.

Satoshi Nakamoto: "Bitcoin—Wikipedia, the free encyclopedia", Jan. 1, 2014, XP055131591, Retrieved from the Internet: URL:http://en.wikipedia.org/wiki/Bitcoin [retrieved on Jul. 24, 2014], pp. 1-38.

File Name: JPA_2003044769_OriginalDocument.pdf, Inoue et al, Smart card uses mailing function to perform electronic fund transfer with other smart card, Original Publication of JP 2003044769, pp. 1-23.

File Name: JPA_2003044769_TRANS.pdf, Inoue et al., Electronic Wallet and Electronic Wallet System Human Translation of document and drawings of JP 2003044769, pp. 1-53.

File Name: JP_2003044769_A_Derwent.pdf, Inoue et al, Smart card uses mailing function to perform electronic fund transfer with other smart card, Derwent Acc-No: 2003-038235, Abstract and Fig 1 of JP 2003044769. pp. 1-3.

* cited by examiner

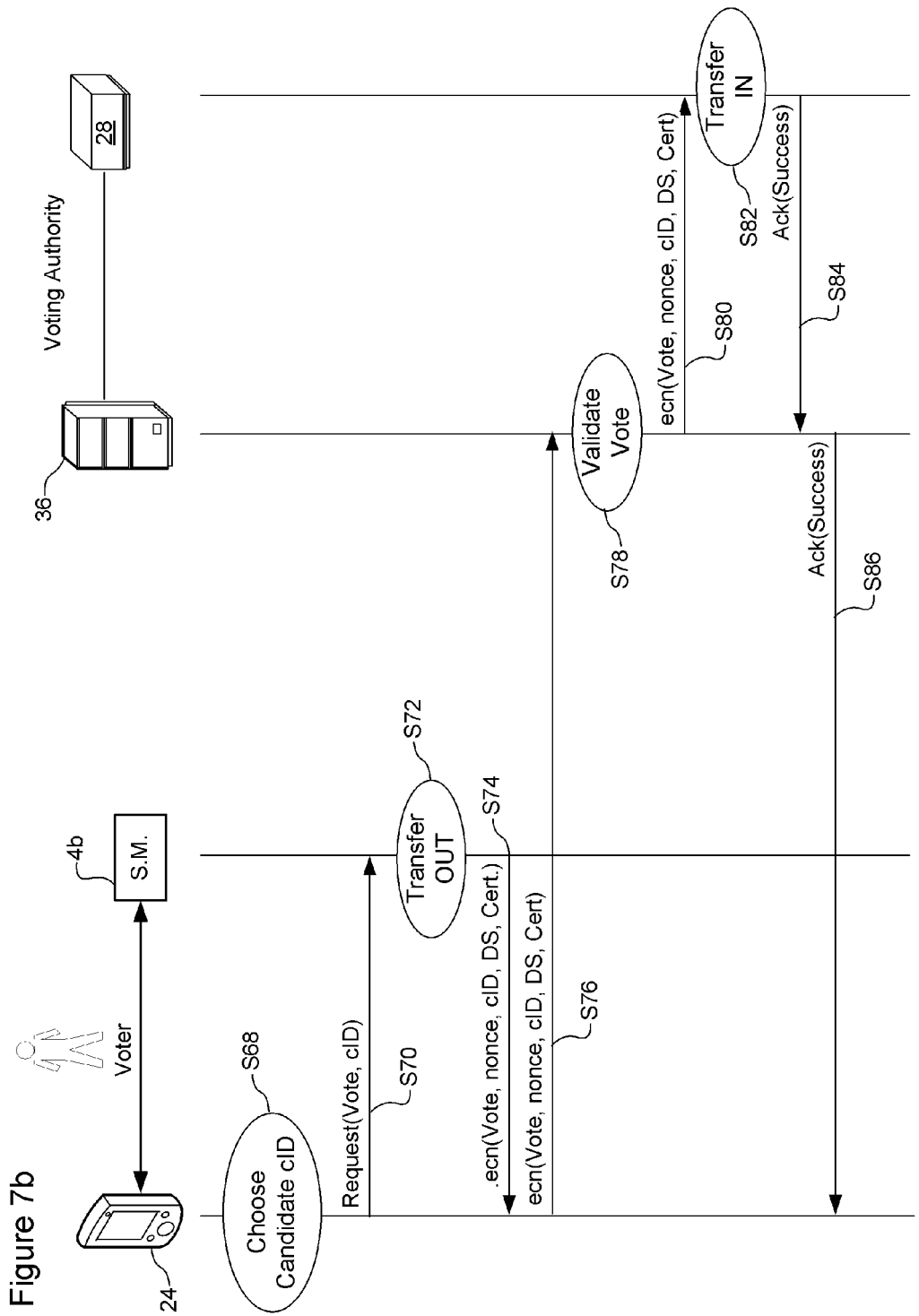

TRUSTED MESSAGE STORAGE AND TRANSFER PROTOCOL AND SYSTEM

CROSS-REFERENCE TO RELATED APPLICATIONS

This application is based on, and claims benefit of 61/243,203 filed Sep. 17, 2009, and International Patent Application No. PCT/CA2010/000435, filed Mar. 30, 2010. The entire contents of both of the aforementioned applications are hereby incorporated herein by reference.

MICROFICHE APPENDIX

Not Applicable.

TECHNICAL FIELD

The present invention relates to a trusted message storage and transfer protocol and system.

BACKGROUND

In the modern telecommunications space, there are numerous scenarios in which it is desirable to be able to securely store and exchange message content between parties. Scenarios in which this type of functionality is desired include, but are not limited to: electronic commerce, in which the message content may include an asset value or monetary amount; electronic voting, in which the message content may include a voter's election; and remote telemetry, in which the message content may include sensor data and/or control commands.

In all such scenarios, message content is stored in a storage media that is "owned" by a party, and it is desired to transfer or send some or all of that message content to a storage media "owned" by another party. The storage media in each case may take any desired form including, for example, a non-volatile memory. The parties involved may be actual people or organizations, or, particularly in the case of remote telemetry systems and the like, an identified station or piece of equipment.

In the context of the present specification, the secure storage and exchange of message contents means that the mechanism for storing and exchanging message content reflects or embodies at least some of the following values:

Message Integrity: When message content is to be transferred from one party to another, a message may be generated which contains the desired message content. It should be computationally infeasible to modify that message in a manner that cannot be detected by a party who subsequently receives that message.

Security: it should be computationally infeasible for a party to obtain unauthorized access to message content within a storage media. Similarly, in a case where a party improperly receives message content addressed to another party, it should be computationally infeasible for the receiving party to improperly store that message content to their own storage media.

Irrevocability: When message content is to be transferred from one party to another, a message may be generated which contains the desired message content. The message generation mechanism should preferably operate in such a manner that the message cannot subsequently be revoked by the sending party.

Non-repudiation: A message containing content to be transferred from a sending party to a receiving party should be tagged in such a manner that the sending party cannot plausibly assert that the message was generated and sent by some other party;

Anonymity: The storage and transfer mechanism should operate in such a manner that parties can exchange message content without the intervention of a third party that has knowledge of the identities of the parties to the actual exchange;

Duplicate detection: The message content transfer mechanism should preferably operate in which a way that duplicate messages are detected and handled properly.

It may be noted that it is not essential for all of the above-described values to be present. For example, in some remote telemetry scenarios, the value of "anonymity" may be irrelevant or even undesirable, because the identity of the station or equipment that has sent a message may be useful to the recipient. On the other hand, in some cases this anonymity may be useful in that an unauthorized party that improperly receives a content transfer message cannot determine the identity of the sending party by analysing the message. In a remote telemetry scenario, for example, this may prevent a hacker from correlating intercepted telemetry data to the particular station or equipment that sent it. Similarly, in an on-line voting system, anonymity enables the implementation of "secret voting", while the other virtues of irrevocability, non-repudiation, and duplicate detection allows detection and prevention of election fraud.

Techniques are known by which some, but not all, of the above-noted virtues can be achieved. For example, known encryption techniques such as Public Key Infrastructure (PKI) encryption can be used to encrypt the content of a message and/or apply a digital signature to a message. Use of digital signatures provide message integrity, and also affords a degree of non-repudiation.

The application of a unique number to messages is a well known technique of duplicate detection.

Various methods such as passwords, Person Identification Numbers (PINs), Subscriber Identity Module (SIM) cards can be used, either alone or in combination, to secure access to some types of storage media, such as personal computers (PCs), cell-phones, Personal Digital Assistants (PDAs) and on-line user accounts. However, these techniques are designed to prevent a party from gaining unauthorized access to a device or storage media belonging to another party. It does not prevent a party who has improperly received a message from improperly storing that message on their own storage media.

Known systems for securing communications typically rely on the fact that both of the parties to any message exchange are known to a third party, who is directly involved in the message exchange. A common example of this arrangement is the use of bank debit and credit cards, and the like, where a message content exchange between a card-holder and a merchant, for example, necessarily involves the intervention of the card-issuer (e.g. a bank) who has knowledge of the identity of both the card-holder and the merchant. In some cases, this provides a mechanism for generating audit trails, and, particularly in financial systems, may be required by various regulatory agencies. However, in an on-line voting system, the guaranteed anonymity of at least the sending party is essential to maintain the integrity of secret balloting schemes. Known systems for securing communications cannot accommodate such anonymity without compromising other desirable values such as message integrity and non-repudiation, An electronic message content storage and transfer system that overcomes at least some of the limitations of the prior art remains highly desirable.

SUMMARY

Accordingly, an aspect of the present invention provides an electronic content storage and exchange system. The System includes an interface configured to send and receive messages; a database and a controller. The database includes a plurality of records, each record representing a respective virtual storage media and including at least: a respective unique identifier assigned to the virtual storage media; a respective Private key and certificate assigned to the virtual storage media; a current content value, and a log of content transfers. The controller operates under control of instruction code to execute transfer-in and transfer-out processes in respect of each of the virtual storage media. The transfer-in process includes steps of: receiving, via the interface, a content transfer message including at least a message content to be transferred and the respective identifier assigned to a recipient virtual storage media; accessing the record representing the recipient virtual storage media, based on the respective identifier; and storing the message content to be transferred in the current content of the recipient virtual storage media. The transfer-out process includes steps of: receiving, via the interface, a content transfer request message including at least at least a message content to be transferred and the respective identifier assigned to a sending virtual storage media; accessing the record representing the sending virtual storage media based on the respective identifier; removing the message content amount to be transferred from the current content; generating a content transfer message including the message content to be transferred; and returning the content transfer message.

BRIEF DESCRIPTION OF THE DRAWINGS

Further features and advantages of the present invention will become apparent from the following detailed description, taken in combination with the appended drawings, in which:

FIGS. 7a and 7b are a message flow diagrams schematically illustrating a possible scenario for completing an electronic vote within the application of FIG. 6.

It will be noted that throughout the appended drawings, like features are identified by like reference numerals.

DETAILED DESCRIPTION

The present invention provides methods and systems for electronic message content storage and transfer. Embodiments of the invention are described below, by way of example only, with reference to FIGS. 1-5.

In the following description, the present invention will be described by way of an embodiment in which the secure storage and transfer mechanism is used to enable electronic commerce via the secure storage and exchange of message content in the form of an asset value or a monetary amount. However, it will be recognised that the present invention is not limited to electronic commerce, but rather that the same techniques may be used to implement any communications system in which the values of message integrity, Security, Irrevocability, Non-repudiation, Anonymity and Duplicate Detection are desired.

Figure 1A:
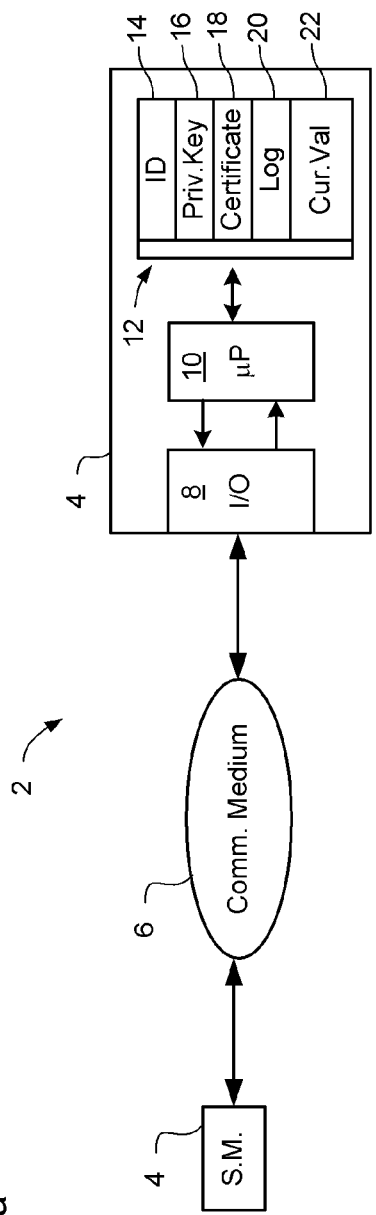
FIGS. 1a and 1b are a block diagrams schematically illustrating a message exchange system in accordance with an embodiment of the present invention.

Referring to FIG. 1a, in very general terms, a message storage and exchange system 2 in accordance with the present invention comprises at least two storage media 4 configured to exchange messages through a communications medium 6. Each storage media 4 comprises an input/output (I/O) interface 8 configured to enable the storage media 4 to send and receive messages through the communications medium 6; a controller 10 responsive to received messages to record transfers of content to the storage media 4 and to transfer content from the storage media 4; and a memory 12 storing a respective unique identifier 14 of the storage media 4, a private key 16 and a certificate 18 uniquely assigned to the storage media 4, a log 20 of content transfers to and from the storage media 4, and a current content (Cur.Val) 22 of the storage media.

The private key 16 and a certificate 18, facilitate encryption and digital signature functionality using, for example, well-known Public Key Infrastructure (PKI) techniques. For the purpose, the private key 16 and the certificate 18 will typically be generated by a trusted Issuing Authority, such as, for example, Verisign™.

It is anticipated that the storage media 4 may be constructed in two variants. In a first variant, the storage media 4 is constructed as a physical device suitable for distribution and use by an individual person. In a second variant, the storage media 4 is constructed as server configured to emulate a desired number of individual personalized storage media. Both of these variants will be described below.

Individual Storage Media

Figure 1B:
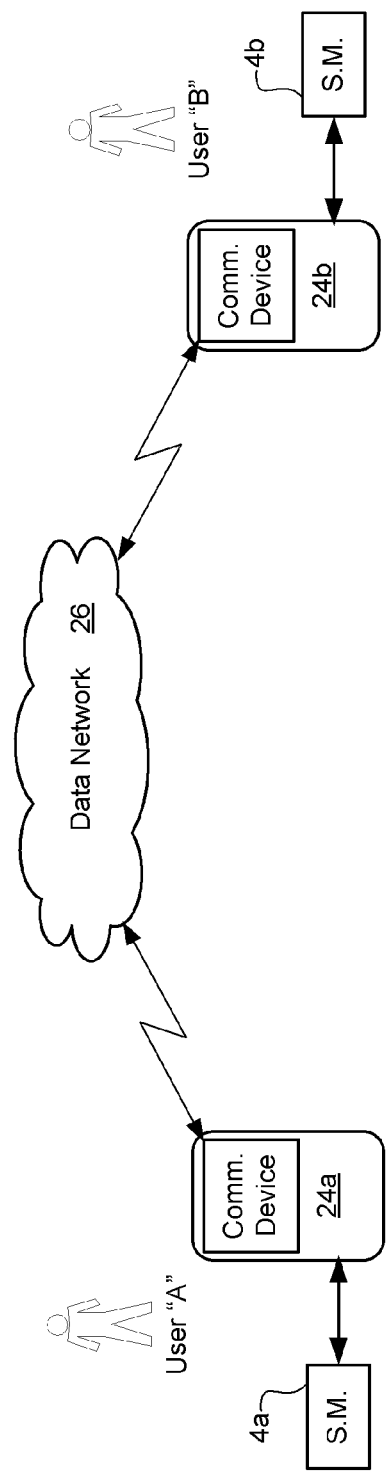

In the case of an individual storage media designed for personal use by a user, the storage media 4 may be configured to connect to a user's communications device 24 for communications through a data network 26, as shown in FIG. 1b. Such a personalized storage media 4 may be manufactured in any suitable form-factor, including, but not limited to, form factors commonly used in smart-cards, USB flash drives or memory cards. The I/O Interface 8 can be provided as any suitable communications link, such as, for example, a Universal Serial Data (USB) or mini-USB connection, a Blue-Tooth™ or Infra-red wireless connection. Other connection technologies may be used, as desired. Preferably, the I/O interface 8 is designed to enable the user to easily and reliably connect and disconnect their storage media 4 to and from a communications device 24, and, when connected, facilitate secure transfer of information between the storage media 4 and the communication device. For this reason, in embodiments in which a wireless interface technology is used, it is preferable that the wireless connection be operative over a very limited distance (e.g. on the order of 10 cm or less), so as to reduce power requirements and enhance security. Various known radio-frequency electromagnetic or magnetic coupling techniques may be used to implement a wireless connection at this distance.

The communication device 24 may take any suitable form, including, but not limited to, Personal Computers (PCs), note-book PCs, Personal Digital Assistants (PDAs), cell phones etc.

The controller 10 and memory 12 may, for example, be constructed using known Subscriber Identity Module (SIM) techniques. However, this is not essential. Preferably, the storage media 4 is configured in such a manner that the controller 10 and memory 12 cannot be removed from the storage media 4 without destroying the controller 10 and memory 12. Use of SIM technology for construction of the controller 10 and memory 12 is beneficial, in that it enables the ID 14, Private Key 16 and certificate 18 to be permanently stored in the storage media 4 in such a manner that it is never destroyed (without destroying the functionality of the entire token, which is inconvenient to the user, but maintains security) and it is not practical to "hack" or reverse engineer the storage media 4 to discover the Private Key 16 or modify any of the log 20, the current content (Cur.Val) 22 or the operation of the storage media 4. As a result, each user of the system 2 has a good reason to believe that the association between the ID 14, Private Key 16 and Certificate 18 of any given storage media 4 is unique, and cannot be fraudulently duplicated.

In operation, a user (for example User "A" of FIG. 1b) can connect their storage media 4 to a communications device 24a, and interact with their storage media 4 to generate and store content via the user interface of their communications device 24a. Typical operations in this respect are described below with reference to FIGS. 2a and 2b.

Figure 2B:
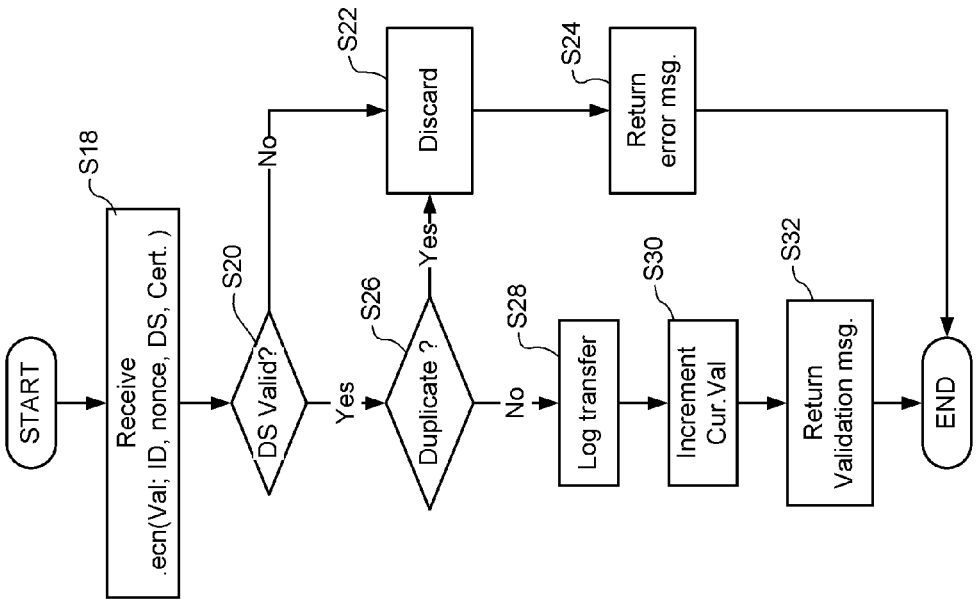
FIGS. 2a and 2b are flow charts showing representative "Transfer-in" and "Transfer-out" processes in accordance with an embodiment of the present invention.
Figure 2A:
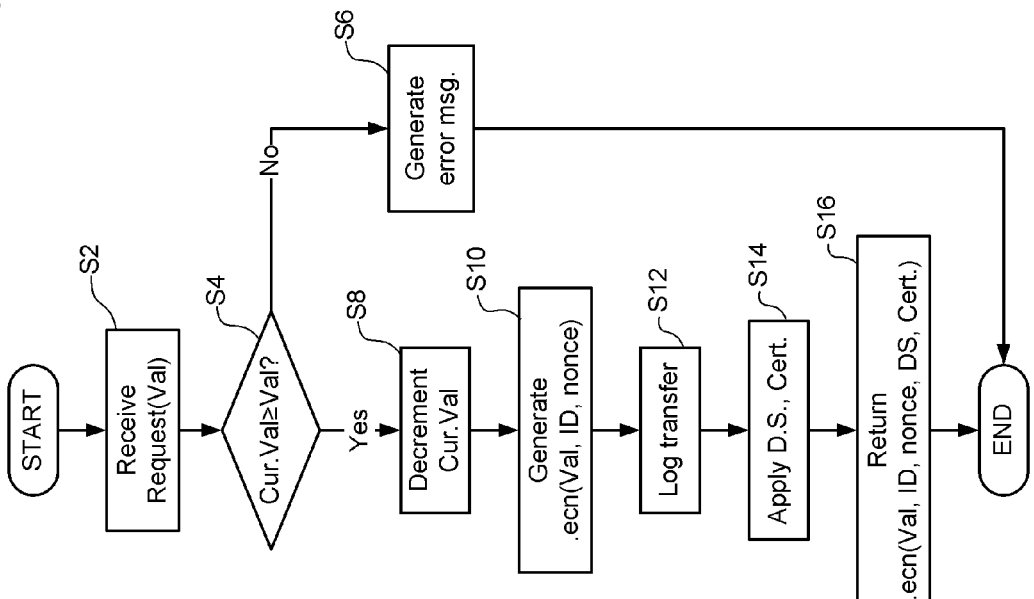

FIG. 2a is a flow chart illustrating a representative process of generating a content message for transferring content out of the storage media 4. As may be seen in FIG. 2a, the transfer-out process begins with the user interacting with the user interface of their communications device 24 to send a request message containing an indication of the content (Val.) to be transferred to their storage media 4. Upon receipt of the request message (at S2), the controller 10 compares (at S4) the content (Val.) to be transferred to the current content (Cur.Val) 22 stored in the memory 12. If Cur.Val 22 is less than the content to be transferred (Val.), then the controller 10 generates and returns an error message (at S6). Otherwise, the controller 10 decreases the Cur.Val 22 by the content (Val.) to be transferred (at S8), and then generates (at S10) a content transfer message containing the content (Val.) to be transferred, and a nonce which uniquely identifies the content transfer message, at least among the content transfer messages generated and sent by the storage media 4, and the ID 14 of the storage media 4. The controller 10 then records information about the transfer in the log (at S12), and applies a Digital Signature (DS) and the Certificate 18 to the transfer message (at S14). Finally, the controller 10 returns the digitally signed transfer message (at S16) to the user's communications device 14. Upon receipt of the digitally signed transfer message, the user can then send the transfer message to a desired recipient party (eg User "B" of FIG. 1b) using any suitable communications means, including, for example, as an attachment to an e-mail message.

In the embodiment of FIG. 2a, the content transfer message generated by the controller 10 (at S10) contains the ID of the storage media 4. However, this is not essential. In some embodiments, the ID of the storage media 4 may be omitted, if desired. In some embodiments, the content transfer message may include an ID of an intended recipient storage media, either in place of or in addition to the ID of the storage media 4.

In the embodiment of FIG. 2a, the content transfer message generated by the controller 10 (at S10) contains a nonce. In general, the nonce can be any alpha-numeric string that enables a recipient party to verify the uniqueness of the content transfer message, at least among content transfer messages generated by the storage media 4. In some embodiments, the nonce may be generated by the controller 10 as part of the transfer-out process. However, this is not essential. In some embodiments, the nonce may be supplied by the recipient party prior to initiation of the transfer-out process, and supplied to the storage media 4 in the Request message (FIG. 2a, at S2). For example, in the embodiment of FIG. 1b, User-A and User-B may use their respective communications devices 24a and 24b to communicate in a conventional manner, during which, the parties agree to transfer content from User-A's storage media 4a to User-B's storage media 4b. In order to initiate the transfer, User-B may interact with their communications device 24b generate and send a nonce to User-A's communications device 24a. Upon receipt of the nonce, User-A can interact with their communications device 24a to send a Request message including the received nonce to their storage media 4a, to trigger execution of the transfer-out process. Upon receipt of the transfer request message, User-B's communication device can compare the nonce contained in the request message against the nonce originally sent to User-A. This arrangement is beneficial, in that enables User-B to positively associate any given received transfer request message to a specific content exchange transaction, without altering the ability of their storage media 4 to detect and handle duplicates.

FIG. 2b is a flow-chart showing a representative "transfer In" process which may be executed by the Storage Media 4 to store received content in the memory 12. Referring to FIG. 2b, the transfer-in process begins with the user interacting with the user interface of their communications device 24 to input a received content transfer message to the storage media 4. Upon receipt of the transfer message (at S18), the controller 10 uses the Certificate 18 to verify (at S20) the digital signature of the received content transfer message. If the verification fails, the content transfer message is discarded (at S22), an error message is returned (at S24) to the user's communication device 24 before the transfer-in process is terminated. If the verification is successful, the controller 10 uses the nonce and the ID 14 of the sending Storage Media to compare (at S26) the received content transfer message with its log 20 to determine whether the content transfer message is a duplicate of a content transfer message previously received from the sending Storage Media. If it is a duplicate, the content transfer message is discarded (at S22), an error message is returned to the user's communication device (at S24) and the transfer-in process is terminated. Otherwise, the controller 10 records information about the transfer in the log (at S28), and increases the current content (Curr.Val) 22 stored in memory 12 by the content (Val.) to be transferred (at S30). Finally, the Storage media 4 returns a validation message (at S32) to the user's communication device 24, indicating that the content has been successfully stored in the memory 12.

As noted above, the log 20 maintains a record of content transfers into and out of the Storage media 4. In some embodiments, the information recorded in the log 20 comprises the content of each transfer message received of sent by the Storage media 4. In some embodiments, a digest of each transfer message may be recorded in the log 20, rather than the entire message. In some cases, the digest may take the form of a hash computed over at least a portion of the transfer message. Recording a hash of received transfer messages, for example, enables effective detection of duplicate messages while minimizing the amount of memory required to store the log 20. In some embodiments, sent and received transfer messages may be recorded in respective separate logs. This arrangement is beneficial in that it facilitates respective different information sets to be recorded in each log 20. For example, the log of sent messages may record the entire transfer message sent by the Storage media 4, while the log of received messages merely records a hash of each received message.

The foregoing processes for generating content transfer messages and storing received content in storage media 4 affords numerous advantages. For example, content transfer messages are generated by the controller 10 in response to a request initiated by the user. The returned content transfer message is tagged with a digital signature, and contains the ID 14, and certificate 18 of the storage media 4. Taken together, these elements ensure that any alteration of the transfer message can be detected by a recipient, thereby providing message integrity, and further ensure that the Storage medium 4 that generated the message is identified. Furthermore, since users have good reason to trust that the ID 14, private key 16 and Certificate 18 assigned to each storage medium is both unique and secure against hacking, a user cannot plausibly argue that a transfer message was generated and sent by someone other than the holder of the identified storage media 4, thereby providing message non-repudiation, in the absence of a claim that a storage media 4 has been lost or stolen.

As noted above, when a content transfer message is generated, the current content (Cur.Val) 22 is decremented by the content being transferred (FIG. 2a at S8). As such, a sending party has a strong disincentive to delete the transfer message without sending it, because then the content contained in the transfer message is irretrievably lost. The only way to avoid this loss is to execute the transfer-in process described above with reference to FIG. 2b to store the content back into the storage medium. This provides at least a simple level of irrevocability. A higher level of irrevocability can be obtained by modifying the transfer-in process of FIG. 2b such that the controller 10 will discard received content transfer messages (FIG. 2b at S22 and S24) generated by itself.

As noted above, the use of SIM technology provides security of each storage media 4, in that it is computationally infeasible for a party to obtain unauthorized access to message content stored within a storage media 4. Security of transfer messages can be obtained by modifying the transfer-out process of FIG. 2a such that the request message must contain at least the ID 14 of the intended recipient storage media, and this information is included in the generated transfer message, along with the ID of the sending storage media. The transfer-in process of FIG. 2b can be modified in a complementary manner, such that it will discard transfer messages (FIG. 2b at S22 and S24) that do not contain its own ID as the intended recipient. As a result, it is not computationally feasible for a receiving party to improperly store message content addressed to another party in their own storage media.

Additionally, each content transfer message may contain the ID 14 of at least the specific storage media 4 that generated that particular transfer message, and in some cases also the ID 14 of the intended recipient storage media. However, it does not identify the respective parties who own the involved storage media 4. In some cases, a distributing authority may record information identifying each party to whom a storage media 4 is provided, in which case the distributing authority would be able to identify at least the party that sent any given content transfer message. However, following the processes described above with reference to FIGS. 2a and 2b, content transfer messages can be generated by a sending party, and sent to a desired receiving party who then stores the received content in their own storage media 4, all without the involvement of any third party including the distributing authority. As such, anonymity is achieved, in that the content exchange can take place between the sending and receiving parties without the involvement of any third party that has knowledge of the identities of the sending and receiving parties.

Storage Media Server

In some scenarios it may be undesirable to manufacture and distribute personalized storage media to individual users. In such cases, a Storage Media Server 28 of the type illustrated in FIG. 3b may be used.

Figure 3A:
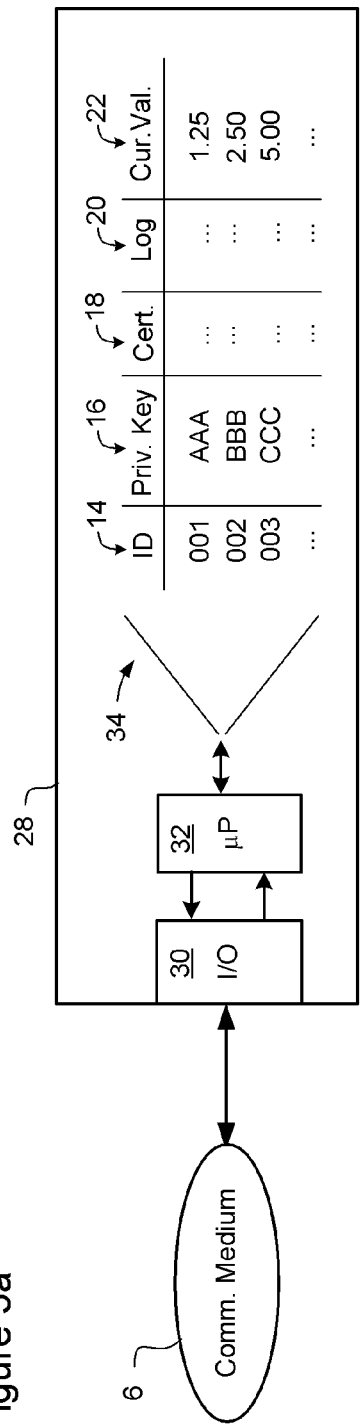
FIGS. 3a and 3b are a block diagrams schematically illustrating a message exchange system in accordance with a second embodiment of the present invention.
Figure 3B:
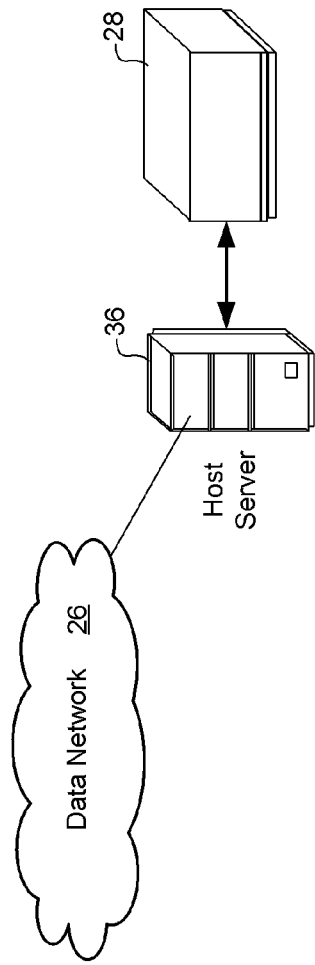

As may be seen in FIG. 3b, the Storage Media Server 28 comprises an I/O interface 30, controller 32 and a database 34 which are configured to operate in a manner broadly similar to the I/O interface 8, controller 10 and memory 12 of a personalized individual storage media 4 of FIG. 1a. However, important differences between the individual storage media 4 and the Storage Media Server 28 lies in the capacity of the I/O interface 30 and the controller 32, both of which are significantly larger their counterparts in the individual storage media 4, and the database 30 contains data of a plurality of individual storage media 4. In some embodiments, the database may be formatted into records, each record representing a respective individual storage media 4 and containing fields for storing the respective ID 14, Private Key 16, Certificate 18, log 20 and current content 22 of that individual storage media 4. The format of each of these fields is preferably identical to the corresponding fields in the memory 12 of an individual storage media 4, so that content transfer messages can be exchanged between individual storage media 4 and records of the database 30 using substantially identical transfer-in and transfer-out processes described above with reference to FIGS. 2a and 2b in each device. This is beneficial in that the Storage Media Server 28 effectively emulates a plurality of individual storage media 4, each of which exhibits the same functionality to a user.

Security of the Storage Media Server 28 is obtained by limiting the functionality of the Storage Media Server 28 to the generation and reception of transfer messages as described above with reference to FIGS. 2a and 2b. For this purpose, a service provider may connect the Storage Media Server 28 to a host server 36 which is connected to a data network 26 for exchange of messaging with subscribers, as may be seen in FIG. 3b. This arrangement is beneficial in that it enables the host server 36 to provide a "firewall" behind which the Storage Media Server 28 is located, and further allows the service provider to offer various services to subscribers, including access to "virtual" storage media.

As may be appreciated, in order for the Storage Media Server 28 to access the correct record (virtual storage media) in the database 30 for generating a content transfer message, the request message (FIG. 2a at S2) must contain at least the ID 14 of the "sending" virtual storage media (record) from which the content is to be transferred. Similarly, in order for the Storage Media Server 28 to access the correct database record for storing content of a received transfer message, the transfer message (FIG. 2b at S18) must contain at least the ID 14 of the recipient virtual storage media to which the content is to be stored.

Figure 4:
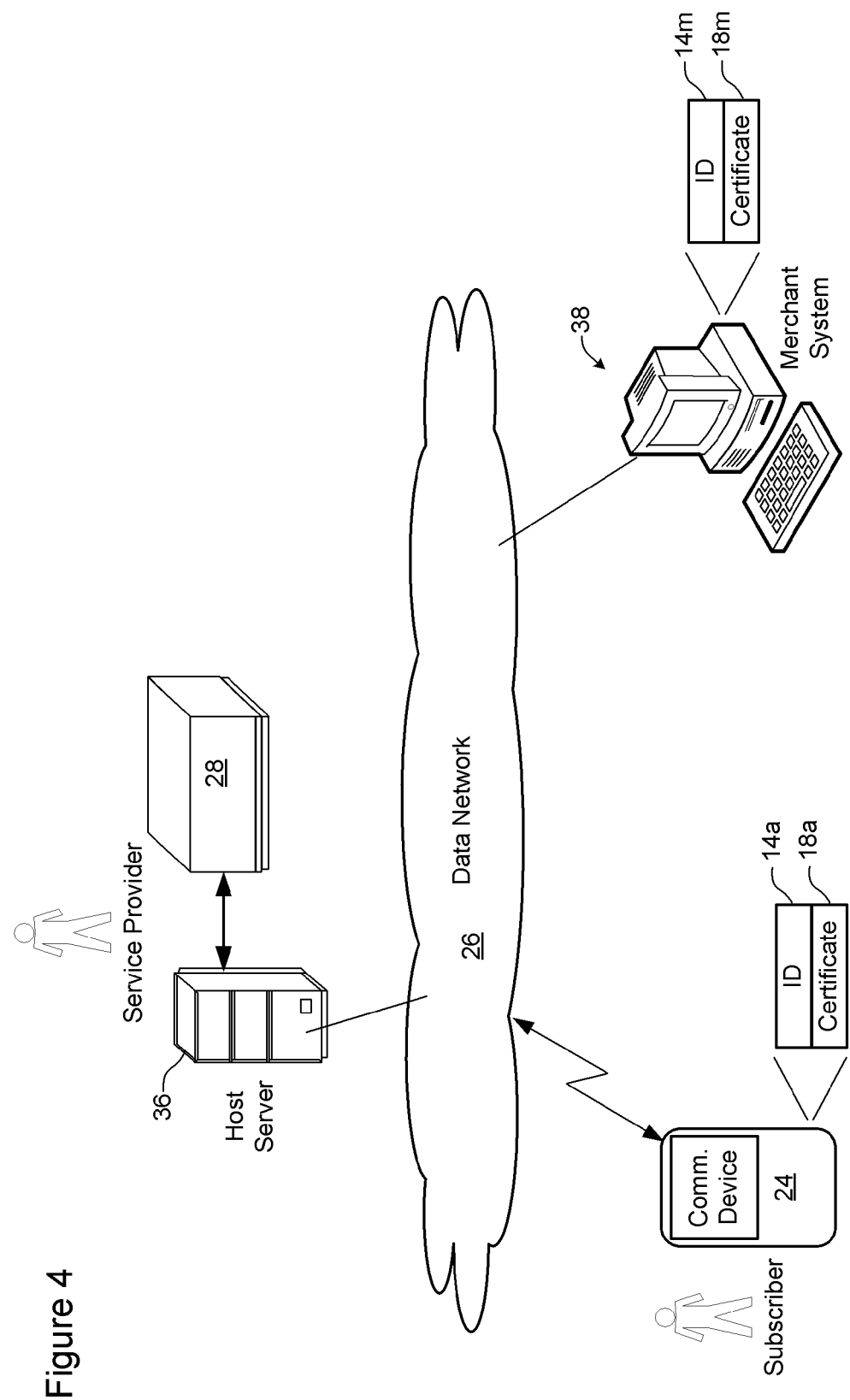
FIG. 4 is a block diagram schematically illustrating elements of an e-commerce application implemented using methods and systems in accordance with embodiments of the present invention.
Figure 5:
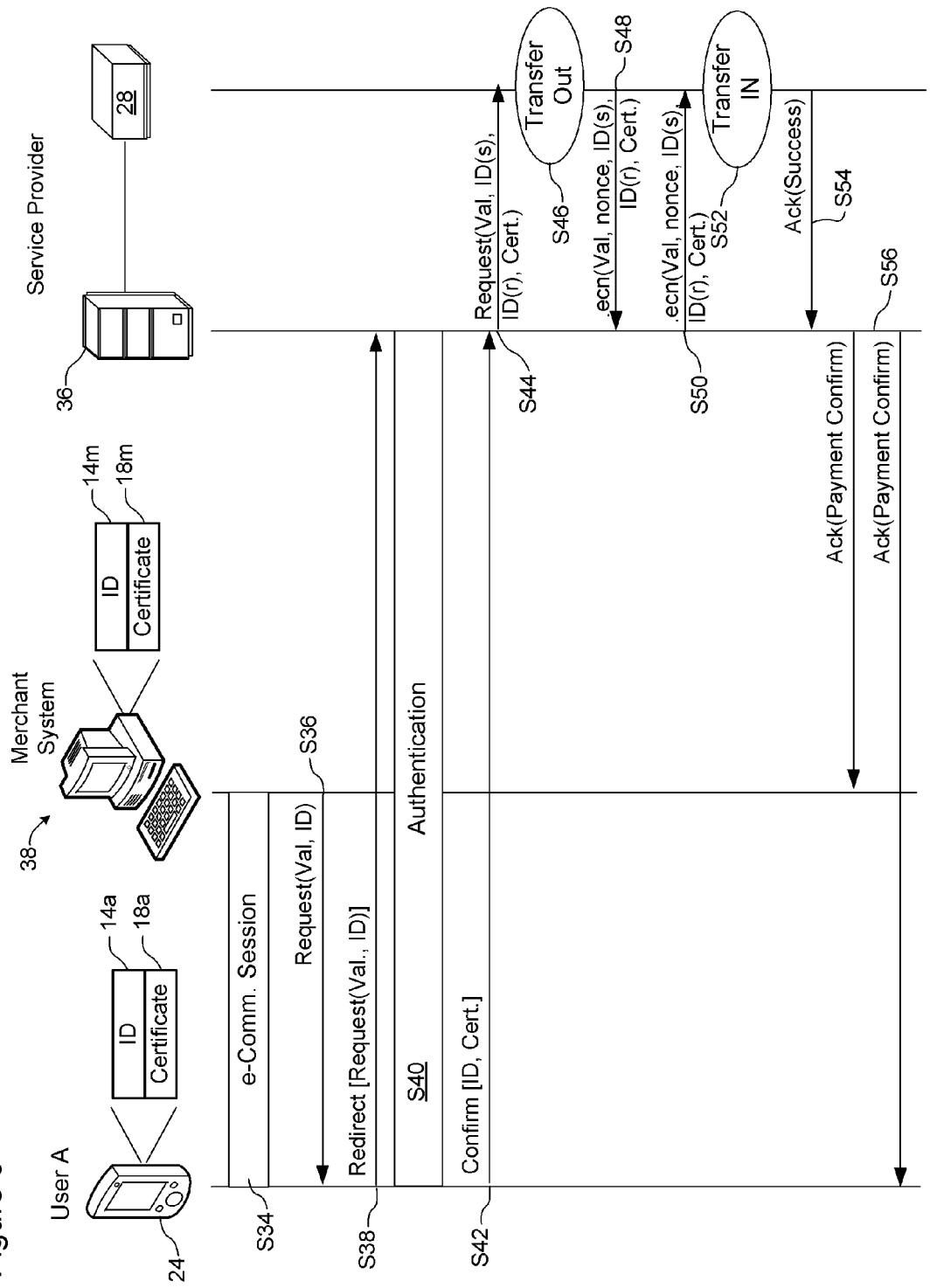
FIG. 5 is a message flow diagram schematically illustrating a possible scenario for completing an e-commerce transaction within the application of FIG. 4.

By way of example only FIGS. 4 and 5 illustrate principle elements and operations of a system in accordance with the present invention, for enabling an e-commerce application. In the context of e-commerce, contents being stored and transferred will typically represent an asset value or monetary amount, and this terminology will be used in the following description.

Referring to FIG. 4, a service provider may use a storage media server 28 and a host server 36 connected to a data network 26 such as the internet to enable an e-commerce application, which is made available to individual subscribers of the service provider. For this purpose, the service provider may respond to a request from a subscriber to instantiate a respective virtual storage media, by populating a record in the database 34 with the requisite ID 14, Private Key 16, and Certificate 18, and then forwarding the ID 14 and certificate 18 of that virtual storage media to the subscriber. In a case where the subscriber is an individual user (such as User "A", in FIG. 4), the user may choose to save the ID 14a and certificate 18a on their communications device 24. In a case where the subscriber is a merchant or the like offering online e-commerce services, the subscriber may save their ID 14m and certificate 18m on a server 38 connected to the data network 26. In either case, the subscriber(s) can subsequently use their ID 14 and certificate 18 to enable e-commerce transactions using their virtual storage media hosted by the service provider. FIG. 5 is a message flow diagram schematically illustrating representative interactions between an individual subscriber (i.e. User "A"), a merchant's server, and a service provider during a possible e-commerce transaction.

Referring to FIG. 5, in a first step (S34), User "A" uses their communications device 24 to access the merchant's server 38, browse the merchant's offerings, and select an item to purchase, all in a conventional manner. Following completion of User "A" purchase selection, the merchant's server 38 initiates a payment sequence, by sending a Request message (at S36) containing the payment amount owing, and the ID 14 of the Merchant's virtual storage device maintained by the service provider. Upon receipt of the Request message, the user's communication device 24 redirects the Request to the Host server 36 (at S38). Upon receipt of the redirected Request message from the user's communication device 24, the Host Server 36 performs an authentication process (at S40) to obtain confirmation of the User's acceptance of the transaction. In some embodiments, this authentication processes may be handled within a secure connection (for example a Secure Sockets Layer (SSL) connection) set up between the User's communication device 24 and the Host Server 36 for this purpose. In some embodiments, a pop-up window of a browser application executing on the User's communication device 24 may be used to enable the user to easily indicate their acceptance or refusal of the transaction. If the User accepts the transaction, a confirmation message is sent to the host server 36 (at S42), which includes the ID 14a and Certificate 18a of the User's virtual storage media. In some embodiments, the confirmations message is sent to the host server 36 as part of the Authentication process (step S40).

Upon receipt of the user's confirmation message, the host server 36 formulates a transfer request message containing the ID 14a of the User's virtual storage media as the sender, the ID 14m of the merchant's virtual storage media as the intended recipient, and the payment amount owing received from the merchant's server 38 as the content to be transferred, and sends this transfer request message to the storage media server 28 (at S44). Upon receipt of the transfer request message, the controller 32 uses the ID 14a of the user's virtual storage media to accesses the appropriate record in the database 34, and then executes the transfer-out process (S46) described above with reference to FIG. 2a, to generate and return (at S48) a content transfer message containing the ID 14a of the User's virtual storage media as the sender, the ID 14m of the merchant's virtual storage media as the recipient, and the payment amount owing as the content being transferred.

Upon receipt of the content transfer message from the storage media server 28, the host server 36 sends the content transfer message back to the storage media server 28 (at S50), so as to trigger the transfer-in process (at S52) described above with reference to FIG. 2b and thereby store the payment amount owing to the merchant's virtual storage media. As described above, upon successful completion of this transfer-in process, the storage media server 28 returns an acknowledgment message (at S54) indicating that the payment amount owing has been stored in the merchant's virtual storage media. Upon receipt of this acknowledgment message, the host server 36 forwards a confirmation message to both the merchant's server 38 and the User's communication device 24 (at S56), so that both parties have confirmation that the payment transfer has been successfully completed.

In the above-described process, the transfer of the payment amount from the User's virtual storage media to the merchant's virtual storage media required a two-stage message flow between the host server 36 and the storage media server 28. This arrangement is beneficial in that in enables the storage media server 28 to operate in a simple Request/Response manner (for example, following the Transfer-in and Transfer-out processes described above with reference to FIGS. 2a and 2b) which reduces the possibility of erroneous transfers between records (virtual storage media) within the database 34. In addition, in some scenarios, the merchant may be using an individual personalized storage media 4 for receiving payments, or else may be a subscriber of a different service provider. In either of these two scenarios, the transfer message output from the storage media server 28 at step S48 would need to be forwarded to either the merchant's server 38 or a host server of the merchant's service provider. By ensuring that the host server 36 receives always receives the transfer message from the sending parties virtual storage media, this functionality can be readily provided.

In some contexts, it may be desirable (or, for regulatory reasons, essential) that the service provider have knowledge of the actual identities of each of its subscribers. In such cases, anonymity of the parties involved in a transaction is not preserved, because the host server 36 is capable of tracking. However, this is not essential. For example, a service provider could accept anonymous requests for virtual storage media, and even collect subscriber fees by using the above-described two-part sequence to transfer pre-determined amounts stored in the appropriate user records of the database 34 to its own record. However, it will be seen that the entire on-line purchase transaction described above in reference to FIG. 5 proceeds entirely on the basis of the ID 14 and certificate 18 issued to each subscriber. This information identifies the particular virtual storage media involved in the transaction, and also provides the values of non-repudiation, non-revocability, message integrity and message security, but it does not provide information of the actual identities of the involved subscribers. As such, unless the service provider has some other process for acquiring information identifying each of its subscribers and the and ID 14 and certificate 18 issued to that subscriber, the service provider would not have any means of identifying the parties to the transaction, and anonymity is preserved.

Figure 6:
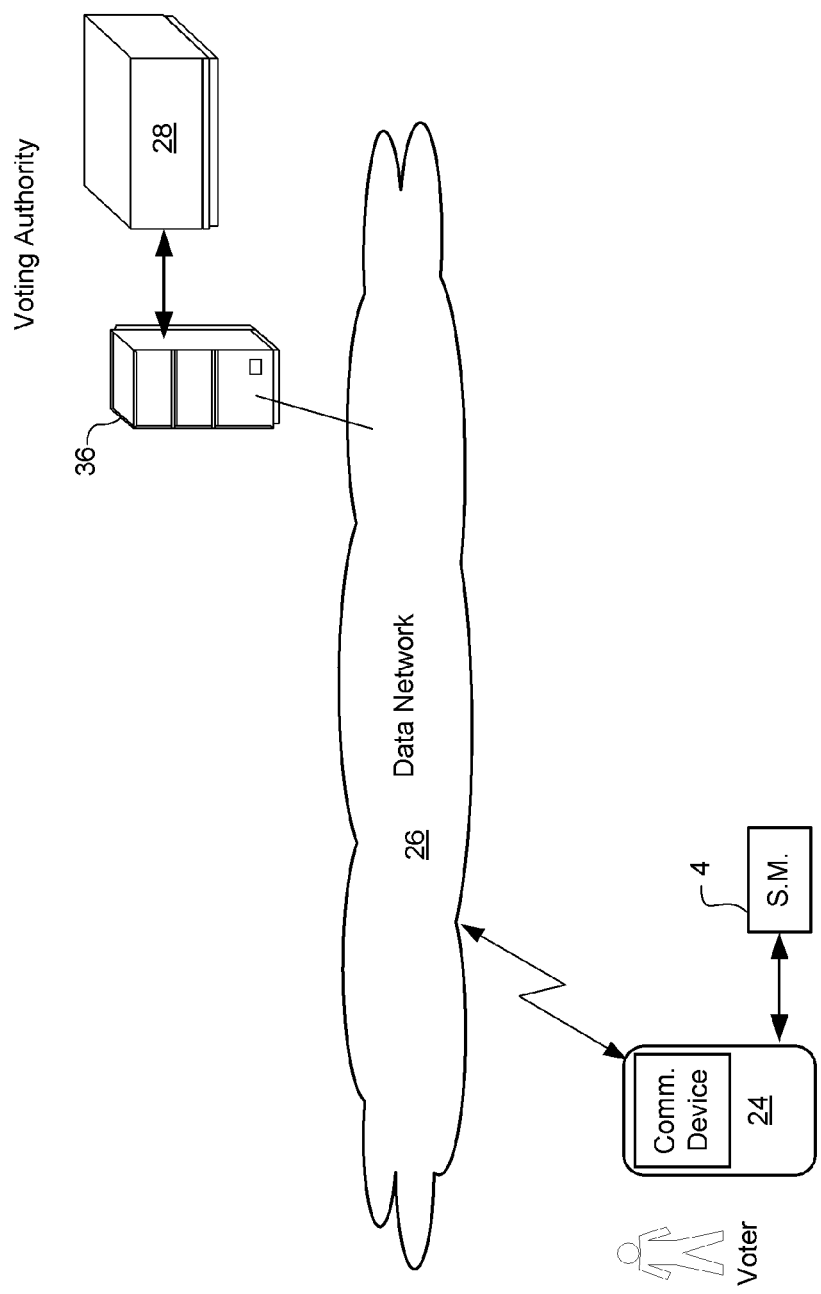
FIG. 6 is a block diagram schematically illustrating elements of an electronic voting application implemented using methods and systems in accordance with embodiments of the present invention.

FIGS. 6 and 7 illustrate principle elements and operations of a system in accordance with the present invention, for enabling an electronic voting application. In the context of electronic voting, contents being stored and transferred will typically represent a vote, and this terminology will be used in the following description.

Referring to FIG. 6, a Voting Authority may use a storage media server 28 and a host server 36 connected to a data network 26 such as the internet to enable an electronic voting application, which is made available to individual voters. In the illustrated embodiment, the storage media server 28 is used to provide a virtual storage media for each candidate who is running for election, so that votes for each of the candidates can be accumulated and recorded. In the illustrated embodiment, the voter is using a personalized storage media 4, of the type described above with reference to FIG. 1. However, this is not essential, if desired, the voter could choose to employ a virtual storage media hosted by a service provider, who is independent of the Voting Authority.

Figure 7A:
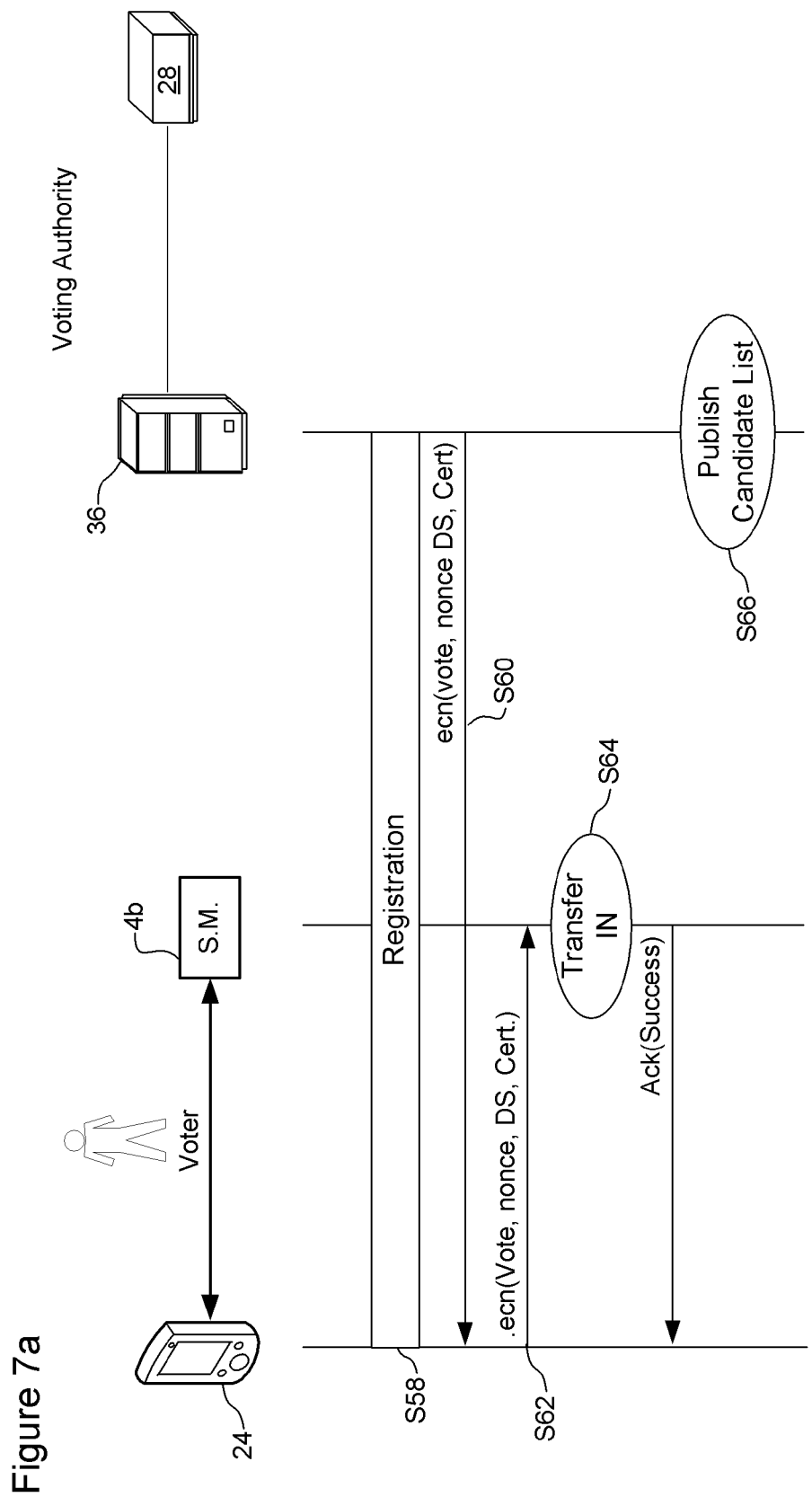

Referring to FIG. 7a, in order to access the electronic voting application, the voter may register with the Voting Authority (at step S58), providing personal identifying information to enable the Voting Authority to verify the eligibility of the voter to participate in the vote. Upon completion of the registration, the Voting Authority generates and forwards a content transfer message (at S60) containing a "Vote indication", a digital signature and a certificate. Upon receipt of the transfer message, the voter can then pass the received transfer message to their storage media 4 (at S62), which then executes a transfer-in process (at S64) as described above with reference to FIG. 2a, to store the vote indication in the memory 12.

In principle, the vote indication can be any value, provided that it is not unique to the individual voter. In some embodiments, the vote indication may be a numeral "1", which has an advantage in that the votes for each candidate can easily be accumulated by simple numerical addition during the vote. In other embodiments, the vote indication may be a value that enables the voting authority to determine whether or not the voter has chosen to "spoil" their ballot in some manner. For example, the vote indication could be a hash of the candidate list. Other possible vote indications will be come apparent to those skilled in the art.

Prior to the vote, the Election Authority may publish (at S66) a candidate list, including a candidate identifier (cID) that uniquely identifies the respective virtual storage media assigned to each candidate.

Referring to FIG. 7b, in order to cast their vote, the voter may use the list of candidates to select the unique identifier (cID) of their preferred candidate (at S68), and forwards a transfer Request message (at S70) including the selected candidate identifier (cID) to their storage media 4, which executes the transfer-out process (at S72) described above with reference to FIG. 2b, and returns a content transfer message (at S74) containing the vote indication, the selected candidate's unique identifier (cID) as the recipient ID, a nonce, a Digital signature and the certificate of the voter's storage media 4. Upon receipt of the content transfer message, the voter can forward the content transfer message (at S76) to the host server 36 of the Voting Authority. This transfer may be accomplished by various means. In some embodiments, the voter may use their communication device 24 to access a web page provided by the Voting Authority, which is configured to enable the voter to upload their content transfer message to the host server 36. An advantage of this arrangement is that the source address of the IP packet(s) used to transport the content transfer message corresponds with a dynamic Universal Resource Locator (URL) address assigned to the communications device 24 by the voter's internet service provider, which will normally last only for the duration of that particular communications session, and which therefore does not reveal the identity of the voter to the Voting Authority. Similarly, the content transfer message itself contains a digital signature and a certificate, which together enable the voting authority to be confident that the content transfer message is irrevocable, non-repudiatable, secure against corruption or alteration, and duplicates can be detected. However, neither the digital signature nor the certificate provide information that identifies the voter. Accordingly, the legitimacy of the vote indication contained in the content transfer message can be verified, without revealing the identity of the voter. Thus voter anonymity is preserved, and it is therefore possible to conduct a secret ballot.

In embodiments in which the vote indication is configured to enable the voting authority to validate the vote, the host server can perform this validation (at S78) upon receipt of the content transfer message from the voter. For example, in an embodiment in which the vote indication is a hash of a candidate list, the host server can use the vote indication to access the specific candidate list, and determine if the cID contained in the transfer message appears in that list. If it does, the vote is considered to be valid. This arrangement has an advantage in that, a voter may be registered to vote in an election between a list of candidates who are specific to a particular geographical region, or public office for which they are running. At the same time, the voter may not be registered to vote in an election between a different list of candidates. Accordingly, if the voter attempts to vote for a candidate who is running in an election for which the voter is not registered, then the voter's ballot has been spoilt, and must be discarded.

Upon successful validation of the vote (at S78), the host server 36 passes the transfer message to the storage media server 28 (at S80), which executes the transfer in process (at S82) as described above with reference to FIGS. 2b and 5 in order to record the vote indication in the appropriate record of the database 34. In embodiments in which vote indication is a simple numerical value (such as "1"), incrementing the current content 22 (FIG. 3a) of the appropriate record (at step S30, FIG. 2b) is a simple process of adding the vote indication to the current value. In embodiments in which the vote indication is some other value, such as a hash of the candidate lists, the step of incrementing the current content 22 (FIG. 3a) of the appropriate record (at step S30, FIG. 2b) can be accomplished by incrementing the current value by "1", rather than by adding the vote indication value itself. Upon successful completion of the transfer in process, the storage media server 28 returns an acknowledgment message (at S84) to the host server 36, and this message can be passed back to the voter's communication device 24 (at S86) to provide the voter with confirmation that their vote has been recorded.

An advantage of the embodiment described above is that the content transfer message contains a digital signature and a certificate, which together enable the voting authority to be confident that the content transfer message is irrevocable, non-repudiatable, secure against corruption or alteration, and duplicates can be detected. Furthermore, the vote indication can be verified against the selected candidate identifier (cID), so that the vote itself can be verified. However, neither the digital signature nor the certificate provide information that identifies the voter, and the content transfer message can be uploaded to the Voting Authority's host server 36, also without revealing the identity the voter. Accordingly, the legitimacy of the voter's election can be verified, while preserving the anonymity of the voter. Thus the methods and systems of the present invention enable the deployment of an electronic voting system capable of conducting a secret ballot.

The embodiment(s) of the invention described above is(are) intended to be exemplary only. The scope of the invention is therefore intended to be limited solely by the scope of the appended claims.

I claim:

1. A storage media server of an electronic content storage and exchange system, the storage media server comprising:
    an interface configured to send and receive content transfer messages to convey the content between respective ones of a plurality of storage media, wherein content being conveyed by a respective content transfer message is stored only in that content transfer message;
    a database comprising a plurality of records, each record representing a respective virtual storage medium and including:
        a respective unique identifier of the virtual storage medium;
        a respective Private key and certificate assigned to the virtual storage medium;
        a respective current content value of the virtual storage medium; and
        a respective log including information of each content transfer message sent or received by the virtual storage medium; and
    a controller configured to:
        execute a transfer-in process including steps of:
            receiving, via the interface, a first content transfer message including a first content to be transferred and the respective unique identifier of a recipient virtual storage medium to which the first content is to be transferred;
            accessing, in the database, the respective record representing the recipient virtual storage medium, based on the unique identifier in the first content transfer message;
            determining whether or not the first content transfer message is a duplicate of a previously received content transfer message based on the information stored in the log of the record representing the recipient virtual storage medium; and
            responsive to determination that the first content transfer message is not a duplicate, storing the first content in the respective current content value of the record representing the recipient virtual storage medium, and responsive to determination that the first content transfer message is a duplicate, discarding the content transfer message; and
        execute a transfer-out process including steps of:
            receiving, via the interface, a content transfer request message including information identifying a second content to be transferred, and the respective unique identifier of a sending virtual storage medium from which the second content is to be transferred;
            accessing, in the database, the respective record representing the sending virtual storage medium based on the unique identifier in the content transfer request message;
            removing the second content from the current content value of the respective record representing the sending virtual storage medium;
            generating a second content transfer message including the second content; and
            returning the second content transfer message.

2. The storage media server as claimed in claim 1, wherein storing the first content comprises adding the first content to the current content value of the respective record representing the recipient virtual storage medium.

3. The storage media server as claimed in claim 1, wherein storing the first content comprises incrementing the current content value of the respective record representing the recipient virtual storage medium by a predetermined value.

4. The storage media server as claimed in claim 1, wherein the first content transfer message comprises at least a certificate assigned to a second storage media, and a nonce generated by the second storage media, and wherein the transfer-in process comprises:
    determining whether the first content transfer message is a duplicate of a previously received content transfer message, based on at least the certificate and the nonce; and
    discarding the first content transfer message if it is a duplicate.

5. The storage media server as claimed in claim 1, wherein the first content transfer message comprises at least a digital signature generated by a second storage media and a certificate assigned to the second storage media, and wherein the transfer-in process comprises:
    determining whether the digital signature is valid; and
    discarding the first content transfer message if the digital signature is not valid.

6. The storage media server as claimed in claim 1, wherein removing the second content comprises subtracting the second content from the current content value of the respective record representing the sending virtual storage medium.

7. The storage media server as claimed in claim 1, wherein removing the second content comprises decrementing the current content value of the respective record representing the sending virtual storage medium by a predetermined value.

8. The storage media server as claimed in claim 1, wherein the transfer-out process comprises:
    determining whether the current content value of the respective record representing the sending virtual storage medium is less than the second content; and
    discarding the content transfer request if the determined current content value is less than the second content.

9. The storage media server as claimed in claim 1, wherein generating a second content transfer message comprises:
    generating a digital signature in respect of the second content transfer message, based on the Private Key of the sending virtual storage medium; and
    applying the digital signature and the certificate of the sending virtual storage medium to the second content transfer message.

10. A method of storing and exchanging content, the method comprising:
    providing a storage media server including:
        an interface configured to send and receive content transfer messages to convey the content between respective ones of a plurality of storage media, wherein content being conveyed by a respective content transfer message is stored only in that content transfer message;
        a database comprising a plurality of records, each record representing a respective virtual storage medium and including:
            a respective unique identifier of the virtual storage medium;
            a respective Private key and certificate assigned to the virtual storage medium;
            a respective current content value of the virtual storage medium, and a respective log including information of each content transfer message sent or received by the virtual storage medium; and a controller;

executing, by the controller, a transfer-in process including steps of:

receiving, via the interface, a first content transfer message including a first content to be transferred and the respective unique identifier of a recipient virtual storage medium to which the first message content is to be transferred;

accessing, in the database, the respective record representing the recipient virtual storage medium, based on the unique identifier in the first content transfer message;

determining whether or not the first content transfer message is a duplicate of a previously received content transfer message based on the information stored in the log of the record representing the recipient virtual storage medium; and responsive to determination that the first content transfer message is not a duplicate, storing the first content in the respective current content value of the record representing the recipient virtual storage medium and responsive to determination that the first content transfer message is a duplicate, discarding the content transfer message; and executing, by the controller, a transfer-out process including steps of:

receiving, via the interface, a content transfer request message including information identifying a second content to be transferred and the respective unique identifier of a sending virtual storage media medium from which the second content is to be transferred;

accessing, in the database, the respective record representing the sending virtual storage media based on the unique identifier in the content transfer request message;

removing the second content from the current content value of the respective record representing the sending virtual storage medium;

generating a second content transfer message including the second content; and returning the second content transfer message.

11. The method as claimed in claim 10, wherein storing the first content comprises adding the first content to the current content value of the respective record representing the recipient virtual storage medium.

12. The method as claimed in claim 10, wherein storing the first content comprises incrementing the current content value of the respective record representing the recipient virtual storage medium by a predetermined value.

13. The method as claimed in claim 10, wherein the first content transfer message comprises at least a certificate assigned to a second storage media, and a nonce generated by the second storage media, and wherein the transfer-in process comprises:

determining whether the first content transfer message is a duplicate of a previously received content transfer message, based on at least the certificate and the nonce; and discarding the first content transfer message if it is a duplicate.

14. The method as claimed in claim 10, wherein the first content transfer message comprises at least a digital signature generated by a second storage media and a certificate assigned to the second storage media, and wherein the transfer-in process comprises:

determining whether the digital signature is valid; and discarding the first content transfer message if the digital signature is not valid.

15. The method as claimed in claim 10, wherein removing the second content comprises subtracting the second content from the current content value of the respective record representing the sending virtual storage medium.

16. The method as claimed in claim 10, wherein removing the second content comprises decrementing the current content value of the respective record representing the sending virtual storage medium by a predetermined value.

17. The method as claimed in claim 10, wherein the transfer-out process comprises:

determining whether the current content is less than the second content; and discarding the content transfer request if the determined current content value is less than the second content.

18. The method as claimed in claim 10, wherein generating a second content transfer message comprise:

generating a digital signature in respect of the second content transfer message, based on the Private Key of the sending virtual storage medium; and applying the digital signature and the certificate of the sending virtual storage medium to the second content transfer message.

* * * * *